US011059461B2

(12) United States Patent
Laarman et al.

(10) Patent No.: US 11,059,461 B2
(45) Date of Patent: Jul. 13, 2021

(54) ELECTRICALLY COUPLED POWERED LANDING GEAR

(71) Applicant: Jost International Corp., Grand Haven, MI (US)

(72) Inventors: Gregory A. Laarman, Holland, MI (US); Brian E. Oestreich, Grand Haven, MI (US)

(73) Assignee: Jost International Corp., Grand Haven, MI (US)

( * ) Notice: Subject to any disclaimer, the term of this patent is extended or adjusted under 35 U.S.C. 154(b) by 574 days.

(21) Appl. No.: 15/877,075

(22) Filed: Jan. 22, 2018

(65) Prior Publication Data

US 2018/0141524 A1 May 24, 2018

Related U.S. Application Data

(63) Continuation of application No. PCT/IB2017/056676, filed on Oct. 26, 2017, and a
(Continued)

(51) Int. Cl.
*B60S 9/08* (2006.01)
*B60D 1/66* (2006.01)

(52) U.S. Cl.
CPC . *B60S 9/08* (2013.01); *B60D 1/66* (2013.01)

(58) Field of Classification Search
CPC ...... B60S 9/08; B60S 9/18; B60S 9/04; B60S 9/06; B66F 3/44; B66F 3/18; B60D 1/66
(Continued)

(56) References Cited

U.S. PATENT DOCUMENTS

| 2,232,187 A | 2/1941 | Reid |
| 2,464,890 A | 3/1949 | Premo |

(Continued)

FOREIGN PATENT DOCUMENTS

| CN | 101808866 B | 6/2012 |
| DE | 19616704 | 10/1997 |

(Continued)

OTHER PUBLICATIONS

International Search Report and Written Opinion of the International Searching Authority from corresponding Patent Cooperation Treaty (PCT) Application No. PCT/IB2017/056676, indicated completed on Jan. 10, 2018.
(Continued)

*Primary Examiner* — Lee D Wilson
*Assistant Examiner* — Seahee Hong
(74) *Attorney, Agent, or Firm* — Gardner, Linn, Burkhart & Ondersma LLP

(57) ABSTRACT

A powered landing gear mounted to a trailer includes an electrical connector mounted to the trailer that is configured to receive a jumper cable connected to a truck for supplying electrical power to the trailer, with a wiring harness mounted to the trailer that is electrically coupled to the connector. A landing gear includes a housing member, a telescoping leg member, a gear assembly configured to extend and retract the leg member relative to the housing member, and a drive system including a drive motor operatively engaged with the gear assembly, with the landing gear being operatively powered by electricity provided through the connector and wiring harness from the truck. The wiring harness may be operatively electrically coupled to the drive motor and/or a rechargeable power supply that is in turn electrically coupled to the drive motor, including through a controller.

22 Claims, 15 Drawing Sheets

Related U.S. Application Data continuation-in-part of application No. 14/620,875, filed on Feb. 12, 2015, now Pat. No. 9,873,410.

(60) Provisional application No. 62/413,101, filed on Oct. 26, 2016, provisional application No. 61/970,870, filed on Mar. 26, 2014, provisional application No. 61/938,940, filed on Feb. 12, 2014.

(58) Field of Classification Search
USPC .......................................................... 254/419
See application file for complete search history.

(56) References Cited

U.S. PATENT DOCUMENTS

| | | | |
|---|---|---|---|
| 2,959,395 A | 11/1960 | Strack et al. | |
| 3,007,677 A | 11/1961 | Dalton | |
| 3,136,527 A | 6/1964 | Griffis | |
| 3,402,915 A | 9/1968 | Dalton | |
| 3,764,162 A | 10/1973 | Rawlings | |
| 3,791,664 A | 2/1974 | Self et al. | |
| 3,888,464 A | 6/1975 | Felsen | |
| 3,927,863 A | 12/1975 | Polsky | |
| 4,847,960 A | 7/1989 | Hafla | |
| 5,118,082 A | 6/1992 | Byun | |
| 5,238,266 A | 8/1993 | Vandenberg | |
| 5,538,225 A | 7/1996 | VanDenberg | |
| 5,542,647 A | 8/1996 | Huetsch | |
| 5,676,018 A | 10/1997 | VanDenberg | |
| 6,224,103 B1* | 5/2001 | Hatcher ............... | B60S 9/08 |
| | | | 254/419 |
| 6,260,882 B1 | 7/2001 | Kingsbury | |
| 6,261,199 B1 | 7/2001 | Schlangen | |
| 6,598,886 B2 | 7/2003 | Baird et al. | |
| 6,893,006 B2 | 5/2005 | Drake, III | |
| 6,994,325 B2 | 2/2006 | Riedl | |
| 7,083,196 B2 | 8/2006 | Riedl | |
| 7,163,207 B2 | 1/2007 | Baird et al. | |
| 7,296,779 B2 | 11/2007 | Bakshi et al. | |
| 7,325,786 B2 | 2/2008 | Drake, III | |
| 7,377,488 B2 | 5/2008 | Schutt | |
| 7,380,825 B2 | 6/2008 | Peveler | |
| 7,398,959 B2 | 7/2008 | VanDenberg et al. | |
| 7,575,249 B2 | 8/2009 | Riedl | |
| 8,051,545 B2 | 11/2011 | Peveler | |
| 8,382,069 B2 | 2/2013 | Alguera et al. | |
| 9,598,057 B2 | 3/2017 | Oestreich et al. | |
| 2002/0030403 A1* | 3/2002 | Lesesky ............... | B60T 13/66 |
| | | | 303/122.02 |
| 2005/0073130 A1 | 4/2005 | McGlothlin | |
| 2005/0168327 A1 | 8/2005 | De Wilde | |
| 2005/0202923 A1 | 9/2005 | Drake | |
| 2006/0043717 A1 | 3/2006 | Baxter | |
| 2008/0146397 A1 | 6/2008 | Drake | |
| 2012/0037862 A1 | 2/2012 | McCarthy et al. | |
| 2014/0077140 A1* | 3/2014 | Baird ................... | B60S 9/08 |
| | | | 254/419 |
| 2014/0157917 A1 | 6/2014 | Oestreich et al. | |
| 2015/0224838 A1 | 8/2015 | Laarman et al. | |
| 2016/0264107 A1 | 9/2016 | Riedl | |

FOREIGN PATENT DOCUMENTS

| | | |
|---|---|---|
| DE | 10017495 A | 2/2002 |
| EP | 401101 A1 | 12/1990 |
| EP | 2233376 B1 | 2/2012 |
| JP | 3-31044 | 2/1991 |
| JP | 8-268240 A | 10/1996 |
| JP | 09071226 A | 3/1997 |
| JP | 2005280389 A | 10/2005 |
| WO | 99/54178 | 10/1999 |
| WO | 2004/096606 | 11/2004 |
| WO | 2004/098965 | 11/2004 |
| WO | 2009/074001 A1 | 6/2009 |
| WO | 2012/072389 | 6/2012 |

OTHER PUBLICATIONS

International Search Report and Written Opinion of the International Searching Authority from corresponding Patent Cooperation Treaty (PCT) Application No. PCT/US2015/015641, dated Sep. 22, 2015.

* cited by examiner

ELECTRICALLY COUPLED POWERED LANDING GEAR

CROSS REFERENCE TO RELATED APPLICATION

The present application is a continuation-in-part of U.S. application Ser. No. 14/620,875 filed on Feb. 12, 2015, now U.S. Pat. No. 9,873,410, which claims priority benefits of U.S. provisional application Ser. No. 61/938,940 filed Feb. 12, 2014 and U.S. provisional application Ser. No. 61/970,870 filed Mar. 26, 2014, and is a continuation of International application Ser. No. PCT/IB2017/056676, which claims priority benefit of U.S. provisional application Ser. No. 62/413,101 filed Oct. 26, 2016, which are all hereby incorporated herein by reference in their entireties.

BACKGROUND OF THE INVENTION

The present invention is directed to a powered semitrailer landing gear, and in particular to a powered landing gear that is electrically coupled with the trailer for connection with a tractor.

Semitrailers include landing gear for supporting the forward portion of the semitrailer when disconnected from a truck, with the landing gear including legs that raise and lower the semitrailer when connecting or disconnecting to the fifth wheel of the truck. The landing gear legs are raised for road travel when the semitrailer is connected to a truck, in which case the legs are retracted without a load. Conversely, when disconnecting the semitrailer the landing gear legs are extended into contact with a support surface to raise the semitrailer such that they are extended while supporting a significant load. Landing gear includes high and low gears for extension/retraction of the legs based on whether the legs are supporting a load or unloaded.

SUMMARY OF THE INVENTION

The present invention provides a powered landing gear system that is mounted to and electrically coupled with a trailer for receiving electrical power from a truck. According to an aspect of the present invention, a powered landing gear system mounted to a trailer comprises a multi-pin electrical connector mounted to a trailer that is configured to receive a jumper cable connected to a truck for supplying electrical power to the trailer, a wiring harness mounted to the trailer and electrically coupled to the connector, and a landing gear assembly mounted to the trailer, with the landing gear assembly including a housing member, a telescoping leg member, a gear assembly configured to extend and retract the leg member relative to the housing member, and a drive system including a drive motor operatively engaged with the gear assembly. A controller is disposed on the trailer, with the controller being configured to selectively operate the drive system, with the drive system being operatively electrically powered through the connector and wiring harness, and with power being additionally supplied through the electrical connector to at least one light on the trailer.

In particular embodiments up and/or down limit switches are electrically coupled with the controller, with the limit switches configured to being tripped by the landing gear assembly. The down limit switch may be tripped when the leg member is moved into an extended position, with the controller operating the drive motor for a predetermined time after the down limit switch is tripped by the landing gear assembly. The up limit switch is configured to being tripped when the leg member is moved into a retracted position, with the controller configured to stop operation of the drive motor after the up limit switch is tripped.

In a still further embodiment, a rechargeable power supply is operatively electrically coupled to the wiring harness with the drive system being operatively electrically coupled to the rechargeable power supply.

A manually operated switch and/or a remote control device may also be provided to raise and lower the leg of the landing gear.

According to another aspect of the present invention, a powered landing gear mounted to a trailer comprises an electrical connector mounted to a trailer, with the connector configured to receive a jumper cable connected to a truck for supplying electrical power to the trailer, with a wiring harness mounted to the trailer and electrically coupled to the connector. A powered landing gear mounted to the trailer includes a housing member, a telescoping leg member, a gear assembly configured to extend and retract the leg member relative to the housing member, and a drive system including a drive motor operatively engaged with the gear assembly, with the landing gear being operatively electrically powered through the connector and the wiring harness.

In a particular embodiment, the drive motor is operatively electrically coupled to the wiring harness. Alternatively or additionally, a rechargeable power supply, such as a battery pack or capacitor, may be provided that is operatively electrically coupled to the wiring harness, where the drive motor of the drive system is operatively electrically coupled to the rechargeable power supply. The rechargeable power supply may be charged while the truck is connected with the trailer and used to extend and retract the leg when the trailer is electrically uncoupled from or disconnected with the truck. The landing gear may additionally include one or more sensors, such as limit switches for sensing movement of the leg member, with the sensors being operatively connected to the wiring harness.

The connector of the trailer may include multiple connections, such as pins, for providing electrical power to the trailer, such as to running, brake and/or turn lights, as well as other components of the trailer. In a particular embodiment the connector comprises an SAE J560 connector.

In a still further particular embodiment, a controller is provided that is electrically coupled to a drive motor for driving the gear assembly to extend and retract the landing gear legs. A switch connected with the controller may be provided to selectively activate the drive motor, and one or more limit switches may be provided to control operation of the drive motor in conjunction with the controller. The controller may be further configured to operate the drive motor for a predetermined time, such as after a limit switch has been activated. A remote control device, such as a wireless key fob, may also be provided to selectively actuate the controller to operate the drive motor. In a particular embodiment the controller comprises an electrical circuit.

In particular embodiments, an actuator is provided that is configured to trip a limit switch when a leg member is moved by the drive system into an elevated position, with limit switch configured to stop operation of the drive motor when tripped. Additionally or alternatively, a limit switch actuator is provided that is configured to trip a limit switch when the leg member is moved by the drive system into an extended position, with the limit switch configured to stop operation of the drive motor when tripped. In a particular embodiment the landing gear assembly includes an elevation member interconnected with the housing member and the leg member, with the elevation member configured to both shift the internal gear assembly into the low speed setting and move the limit switch actuator when the leg member engages a support surface upon being moved by the drive system into an extended position, wherein the limit switch actuator is configured to trip the limit switch when the limit switch actuator is moved by the elevation member. Still further, the internal gear assembly may include an actuator member for shifting the internal gear assembly into the low speed setting, with the elevation member configured to move the actuator member when the leg member engages a support surface and with the actuator member configured to move the limit switch actuator to trip the limit switch. The actuator may be further configured to prevent an internal ring gear from rotating to shift the internal gear assembly into the low speed setting, and the limit switch actuator may be attached to the actuator member. Moreover, one or more limit switches may be electrically coupled to a controller with the controller operating the drive motor for a predetermined time period upon said limit switch being tripped.

The system of the present invention enables the powered landing gear to be readily powered by a truck through the trailer, including by way of operator buttons. Moreover, when used with a rechargeable power supply the system can be recharged during normal operation, such as while in transit. These and other objects, advantages, purposes and features of this invention will become apparent upon review of the following specification in conjunction with the drawings.

BRIEF DESCRIPTION OF THE DRAWINGS

FIG. 1 is a side elevation view of a truck and trailer in accordance with an aspect of the present invention showing a jumper cable connection there between;

DESCRIPTION OF THE PREFERRED EMBODIMENTS

Figure 1:
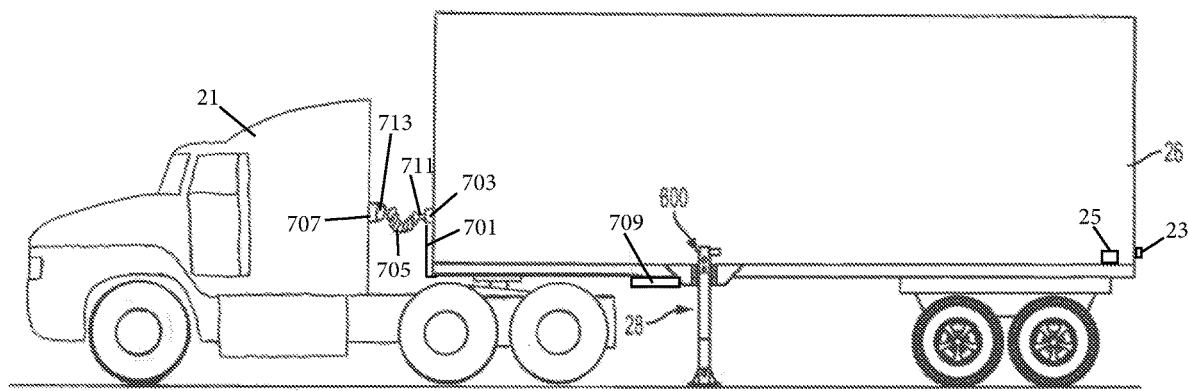
Figure 2:
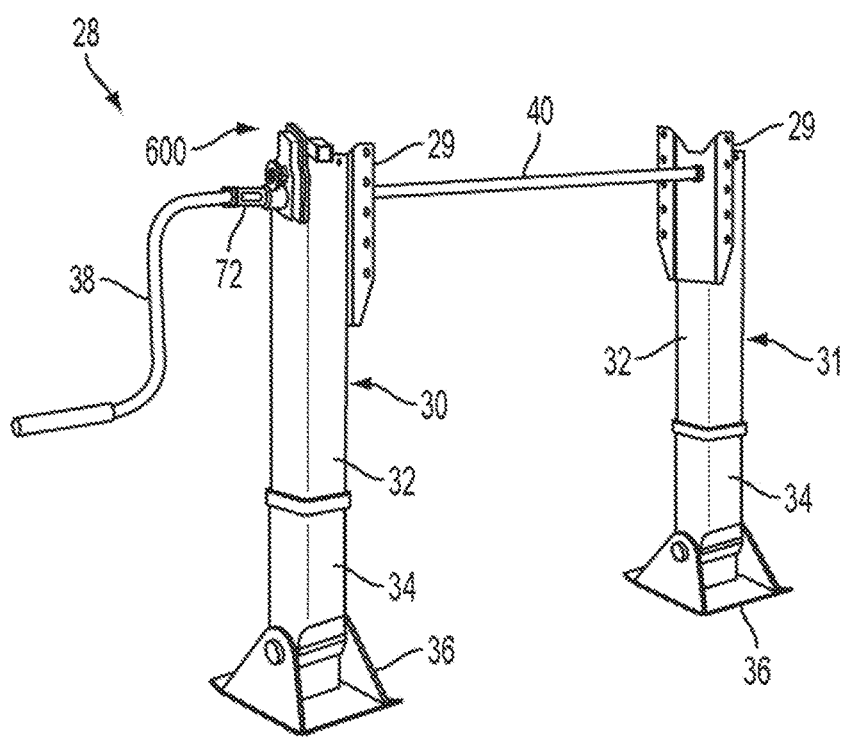
FIG. 2 is a perspective view of the pair of interconnected landing gear removed from the semitrailer of FIG. 1.

The present invention will now be described with reference to the accompanying figures, wherein the numbered elements in the following written description correspond to like-numbered elements in the figures. FIG. 1 discloses a truck or tractor 21 to which is connected a trailer 26, with trailer 26 including a forwardly located powered landing gear assembly 28, with FIG. 2 disclosing the assembly 28 removed from semitrailer 26. Assembly 28 includes a powered landing gear 30 connected with a second landing gear 31 via transverse shaft 40 that are both connected to trailer 26 by flanges 29, with each landing gear 30, 31 including a housing 32 and a telescoping leg 34 having a pad or foot 36 for contacting a support surface.

Figure 1A:
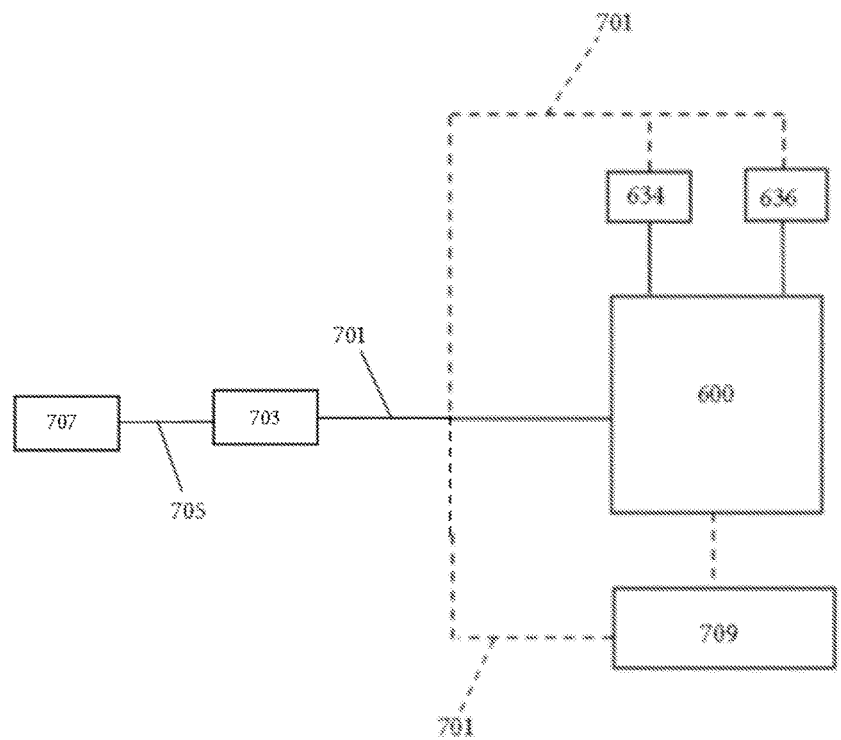
FIG. 1A is a layout of the electrical connection of the truck and trailer of FIG. 1, including the powered drive system of the powered landing gear of the trailer.

Powered landing gear 30 includes a power drive system or assembly 600 that can be selectively engaged or disengaged that, when engaged, may be selectively activated by an operator to extend and retract legs 34 from housings 32. Power drive system 600 is connected to a wiring harness 701 that is wired to connector 703 mounted on the trailer 26, where a jumper cable 705 extends from a connector 707 on the tractor 21 to connector 703. With further reference to FIG. 1A, and as discussed in more detail below, connector 707 is powered by tractor 21 such that the connection of truck 21 with trailer 26 by way of jumper cable 705 provides power to operate powered landing gear 30 by way of providing power to drive system 600. As discussed in more detail below, electrical power from truck 21 may thus be provided to motor 602 of system 600, as well as to sensors or switches 634, 636 of system 600.

Trailer 26 may additionally or alternatively be provided with a rechargeable power supply 709 that is in turn wired to power drive system 600 and wired, such as by way of harness 701, to receive power from trailer 26 through connectors 703, 707 and cable 705. Tractor 21 may then be used to recharge power supply 709 whereby power drive system 600 may operate to extend and retract legs 34 from housings 32 when tractor 21 is disconnected from trailer 26.

It should thus be appreciated that electrical power may be supplied from wiring harness 701 to rechargeable power supply 709 and/or to power drive system 600. Moreover, wiring harness 701 may be operatively connected or electrically coupled with power supply 709 and/or power drive system 600, such as to provide power to a controller 638, such an electrical circuit or the like, a motor 602 and/or sensors of system 600, such as limit switches 634, 636, as discussed below. The operative connection of wiring harness 701 with power drive system 600 and/or power supply 709 may be by way of either a direct connection or indirectly through additional electrical connectors or the like.

Figure 1B:
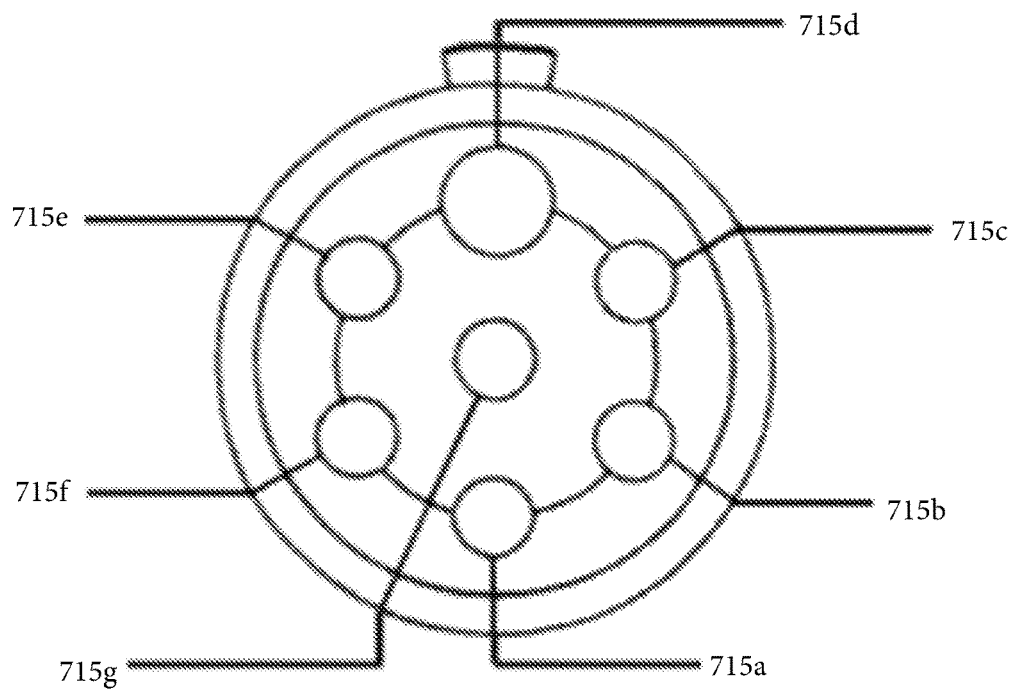
FIG. 1B is a schematic diagram of the seven-way connector in accordance with the present invention used to provide power to the landing gear of the trailer of FIG. 1.

In the illustrated embodiment, connectors 703 and 707 comprise seven-way connectors configured to receive plug in connectors 711 and 713, respectively, of jumper cable 705, where the connectors are configured to meet the Society of Automotive Engineers ("SAE") J560 standard. With reference to FIG. 1B, connector 703 includes seven connectors or pins 715a, 715b, 715c, 715d, 715e, 715f and 715g for providing power to various equipment on trailer 26. In particular, pin 715a is used for stop or brake lights 23 (FIG. 1) and antilock devices, pin 715b is used for left turn lights 25 (FIG. 1) and hazard lights, pin 715c is used for identification, clearance and side marker lights, such as 25b, pin 715d is a ground pin, pin 715e is for tail, license and running lights, such as 25c, and pin 715f is for right turn and hazard lights, with pin 715g being used to provide power to the power drive system 600 and/or to the rechargeable power supply 709.

Comparable connections are provided on connector 707 of truck 21 whereby when jumper cable 705 is installed to electrically couple connectors 703, 707, truck 21 may be used to supply electrical power directly to power drive system 600 and/or rechargeable power supply 709.

In the illustrated embodiment, rechargeable power supply 709 may comprise one or more rechargeable batteries, or alternatively may comprise a capacitor. As such, when truck 21 and trailer 26 are connected via jumper cable 705 and truck 21 is used in normal operation, such as to haul trailer 26, the connection of pin 715g with power supply 709 may be used to recharge the power supply 709, such as via a charging system. In the illustrated embodiment, wiring harness 701 is connected both with power supply 709 and power drive system 600. It should be appreciated that in an alternative embodiment, however, wiring harness 701 may not be connected with power drive system 600, and instead be connected with power supply 709, with power supply 709 in turn connected to drive system 600. In such an embodiment, drive system 600 would operate to raise and lower legs 34 based on power supplied by power supply 709.

Further discussion will now be made of the powered landing gear assembly 28 and powered landing gear 30 with reference to FIGS. 2-10B, which is disclosed in commonly assigned U.S. patent application Ser. No. 14/620,875 (U.S. Pat. App. Pub. No. 2015/0224838, now U.S. Pat. No. 9,873,410), which is incorporated herein by reference in its entirety.

Powered landing gear 30 includes power drive system 600 that can be selectively engaged or disengaged by an operator to drive a gear assembly 42 located internally of housing 32 for extending and retracting leg 34 from housing 32. Alternatively, when power drive system 600 is disengaged, hand crank 38 may be used to drive gear assembly 42 for raising and lowering leg 34. Leg 34 of landing gear 31 is correspondingly extended and retracted relative to its housing 32 via shaft 40. Landing gear 30 thus enables an operator to extend and retract legs 34 automatically or by hand. Still further, as discussed in more detail below, gear assembly 42 provides both a high gear or high speed for rapidly extending and retracting leg 34 when there is no load on leg 34, as well as a low gear or low speed that is reduced from the input rotation provided to gear assembly 42 for extending and retracting leg 34 when loaded. Gear assembly 42, moreover, automatically switches between high and low gears based on gear assembly 42 sensing or reacting to whether or not a load is applied to leg 34. Gear assembly 42 in the illustrated embodiment may comprise a planetary gear assembly or system that is disclosed in commonly owned U.S. patent application Ser. No. 14/096,731 (now U.S. Pat. No. 9,598,057) entitled DUAL-SPEED AUTO-SHIFT LANDING GEAR, and corresponding international patent application PCT/US2013/073134, both of which were filed on Dec. 4, 2013 and are hereby incorporated by reference in their entireties. Landing gear 31 can also include an internal gear assembly 42, or alternatively can comprise a single speed slave landing gear.

Figure 3A:
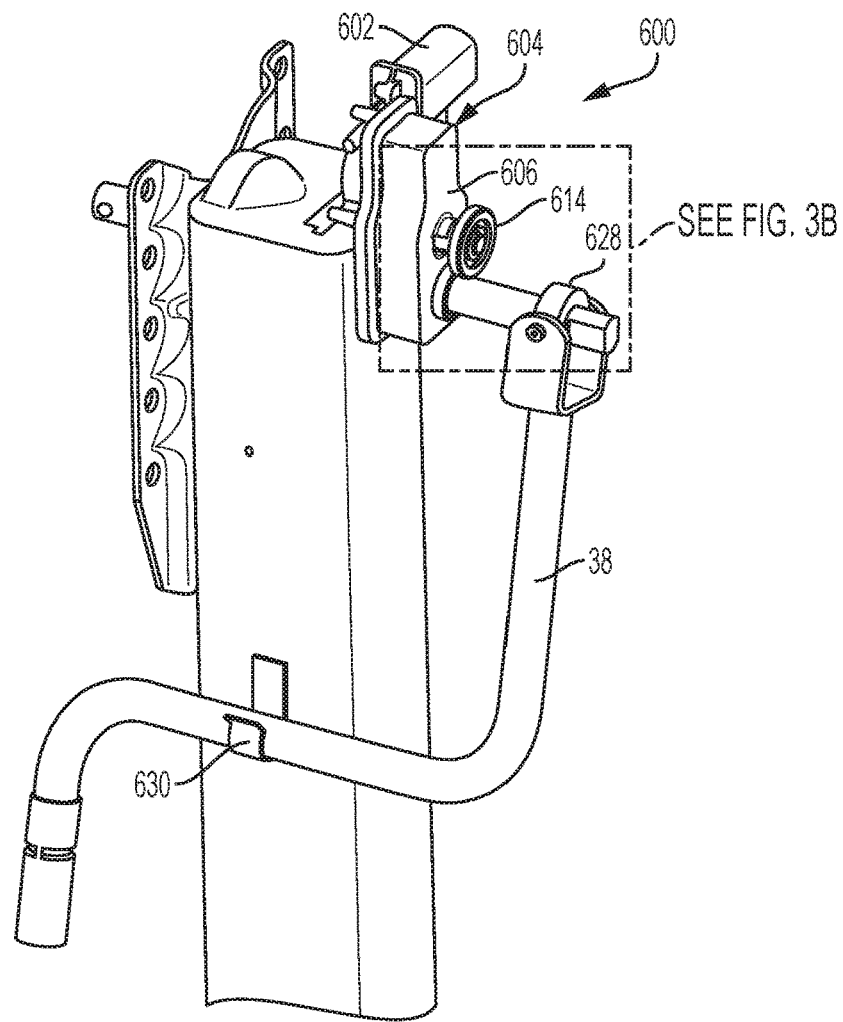
FIG. 3A is a perspective view of a powered landing gear in accordance with the present invention shown with the power drive system engaged whereby it can selectively drive the internal gear assembly of the landing gear.
Figure 3B:
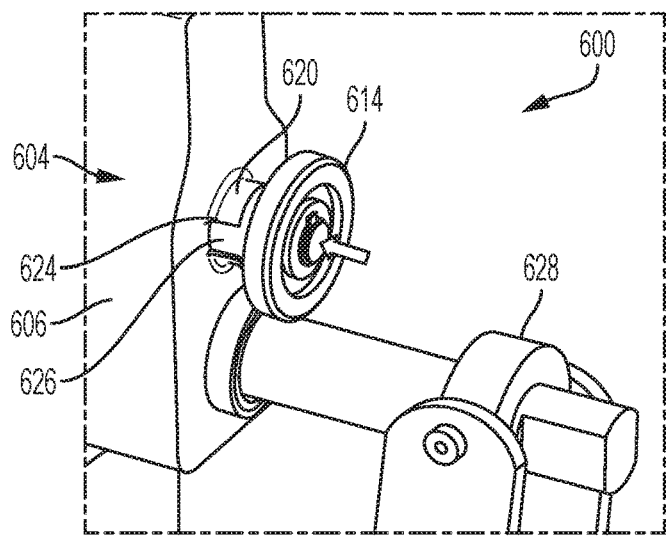
FIG. 3B is a close up partial perspective view of FIG. 3A.
Figure 4A:
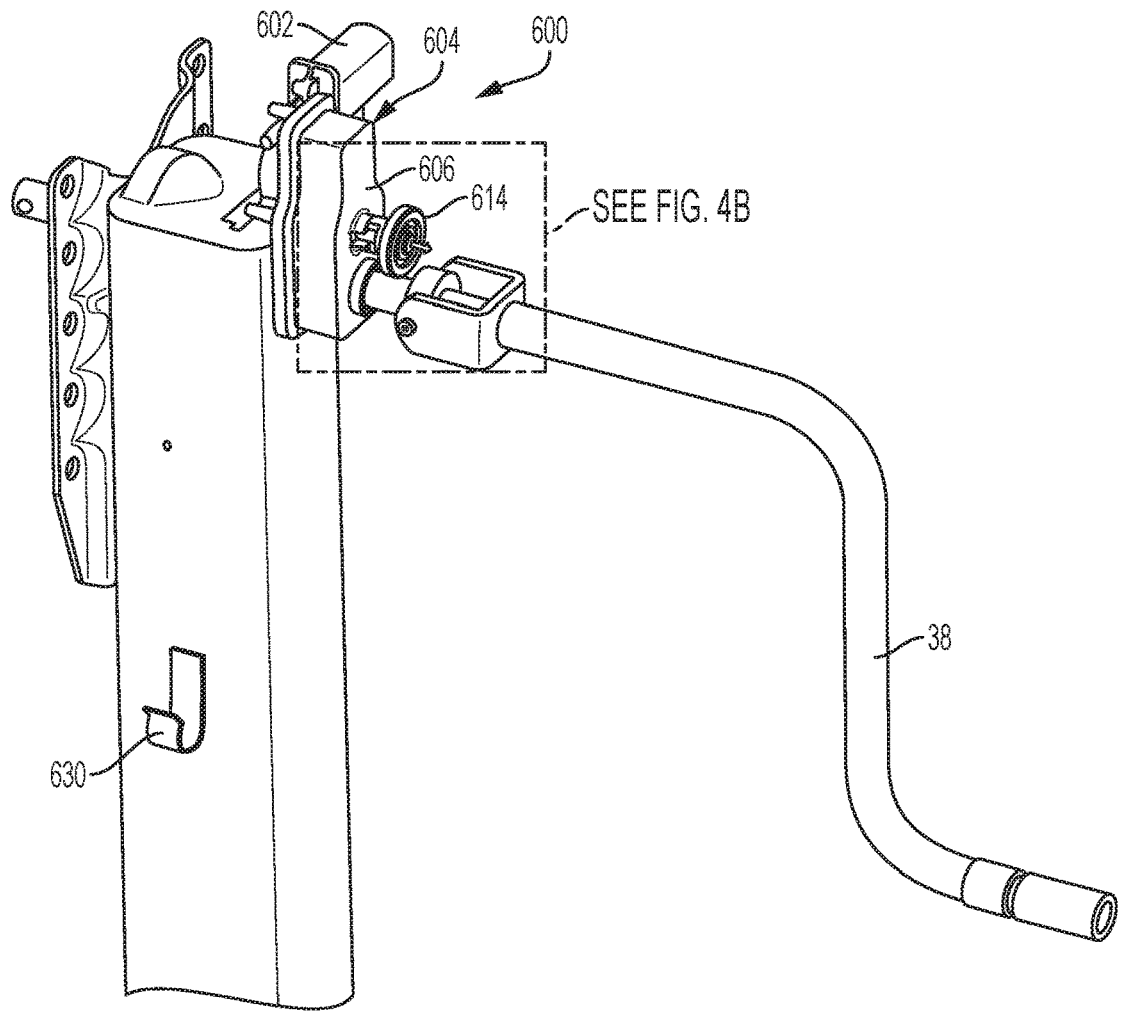
FIG. 4A is a perspective view showing the power drive system disengaged from the gear assembly such that the gear assembly may be driven by the hand crank.
Figure 4B:
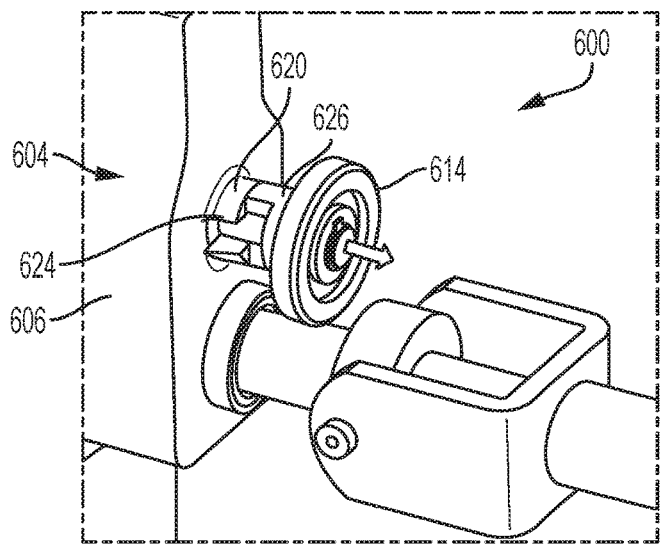
FIG. 4B is a close up partial perspective view of FIG. 4A.

Referring now to FIGS. 3 and 4, power drive system 600 of powered landing gear 30 includes a drive motor 602 and a power gearbox 604. In the illustrated embodiment, drive motor 602 comprises a 12V motor having a worm gear that drives a ring gear (not shown) that is operatively mounted in parallel to a drive gear 608 on shaft 609, discussed below. It should be appreciated that alternative arrangements, constructions and sizes of a drive motor may be used within the scope of the present invention.

Figure 5:
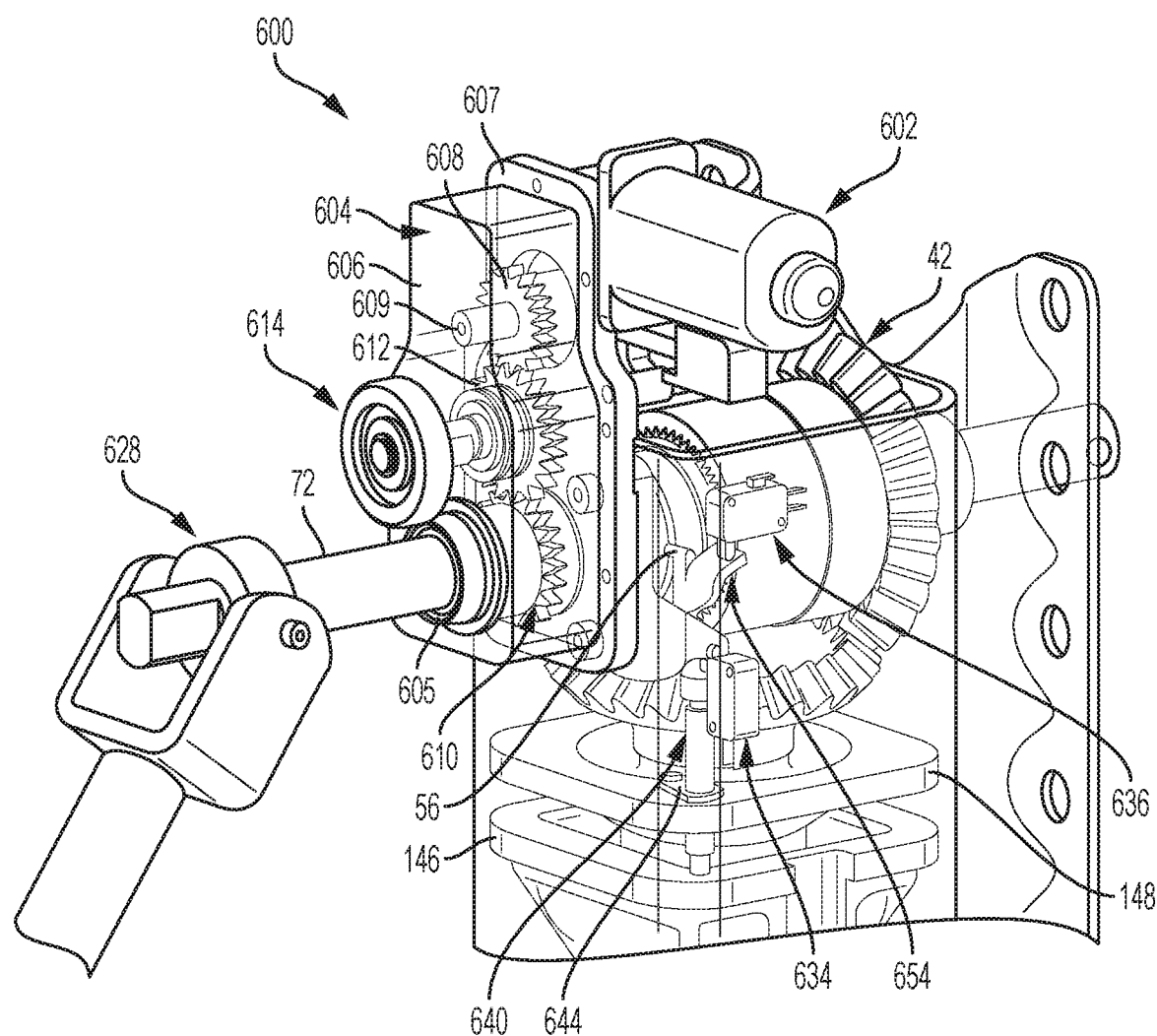
FIG. 5 is a partial upper perspective view of the powered landing gear of FIG. 3 showing the power drive system used to drive the gear assembly located within the landing gear housing.
Figure 6:
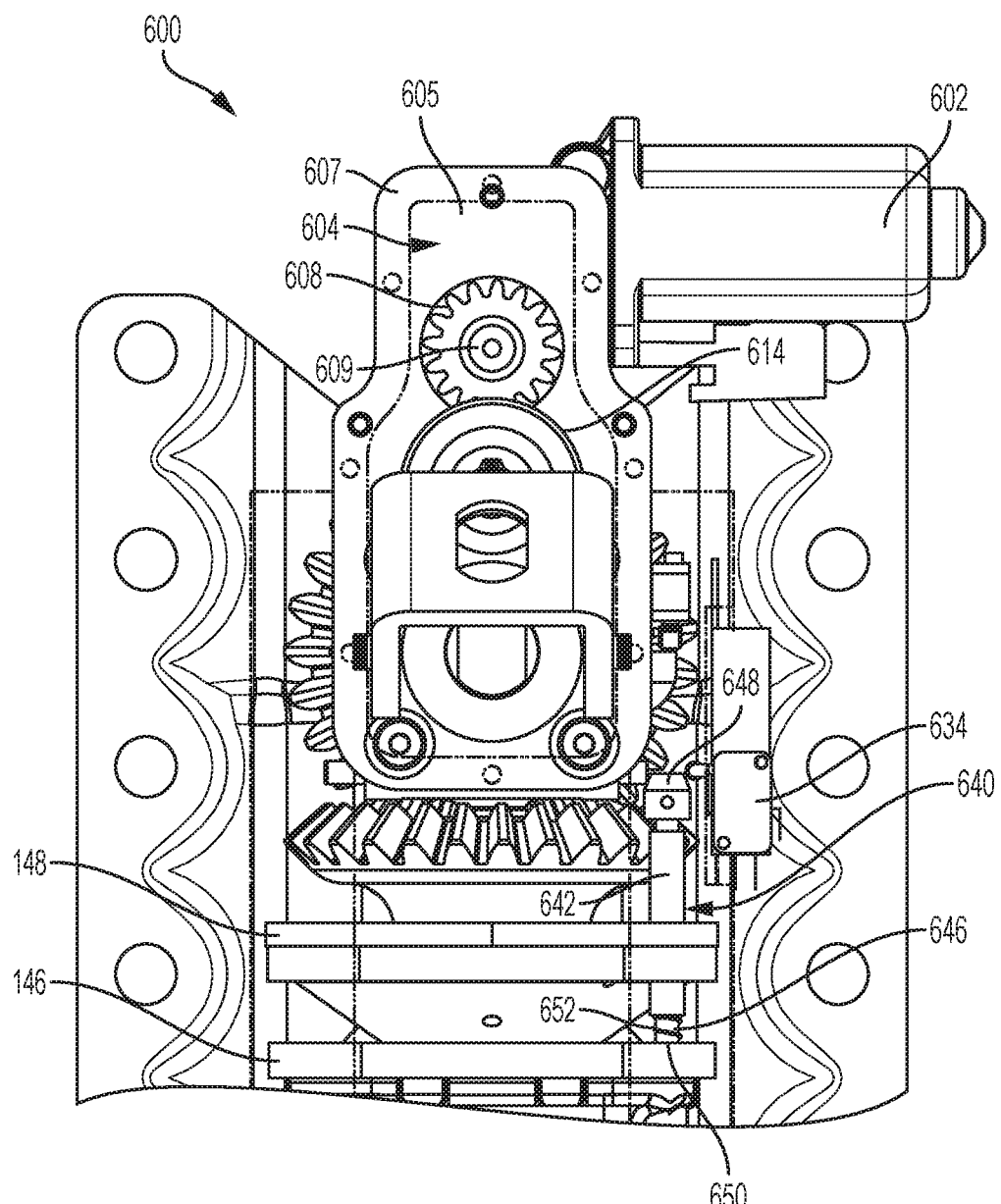
FIG. 6 is a partial front view of the powered landing gear of FIG. 3.
Figure 7:
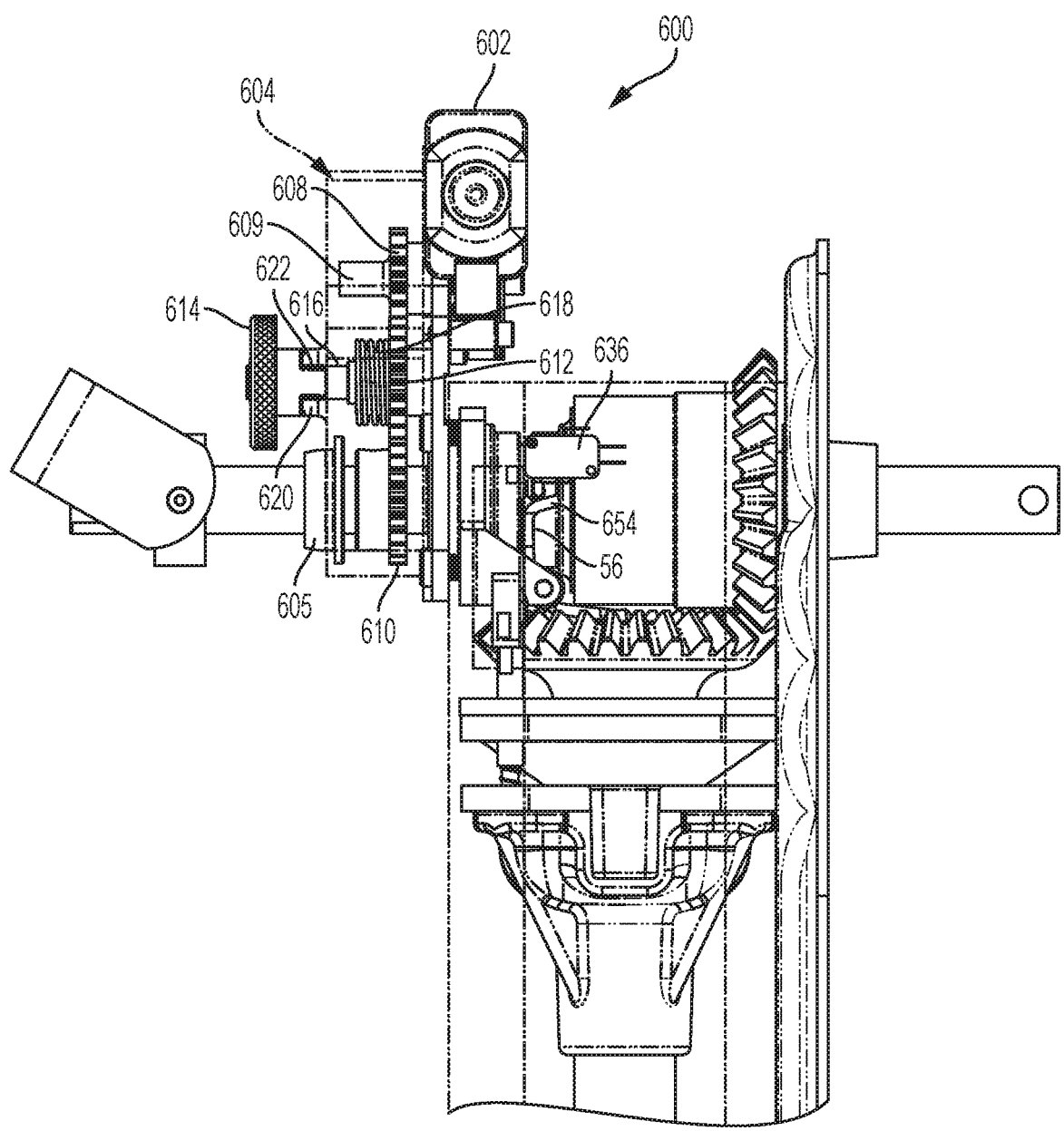
FIG. 7 is a partial right side view of the powered landing gear of FIG. 3.

With further reference to FIGS. 5-7, gearbox 604 includes a housing 606 having a flange 607, with a lower portion of housing 606 being mounted to housing 32 of landing gear 30 by way of fasteners affixed through flange 607 and with the drive motor 602 being mounted to an upper portion of housing 606. Shaft 72 extends into housing 606 at bushing 605, with housing 606 enclosing the drive gear 608, a driven gear 610 and a connecting or transfer gear 612 that is disposed between the drive gear 608 and driven gear 610. Driven gear 610 is operatively connected or mounted to shaft 72, and rotation of shaft 72 provides input torque to internal gear assembly 42 of landing gear 30 for extending and retracting leg 34. Drive gear 608 is operatively connected to drive motor 602 whereby motor 602, when activated, can drive shaft 72 through the connection of drive gear 608 with connecting gear 612 and, in turn, driven gear 608. Motor 602 may be driven in either direction to thereby rotate drive gear 608 in either direction to extend or retract leg 34 relative to housing 32 of landing gear 30 via gear assembly 42, where gear assembly 42 is discussed in more detail below.

As noted, leg 34 of landing gear 30 may alternatively be extended and retracted relative to housing 32 independently of power drive system 600 by disengagement of power drive system 600 from shaft 72 and use of crank 38 to manually rotate shaft 72. Power drive system 600 includes a disengagement member for disconnecting power drive system 600, which in the illustrated embodiment comprises a knurled knob or handle 614 connected or attached with connecting gear 612 via a shaft 616. When handle 614 is pushed in relative to housing 606, as shown in FIGS. 3, 5 and 7, connecting gear 612 is operatively engaged with drive gear 608 and driven gear 610 to thereby transmit power from drive gear 608 to driven gear 610. Power drive system 600 is conversely disengaged from shaft 72 by selectively disengaging connecting gear 610 from drive gear 608 and driven gear 610 by pulling handle 614 out relative to housing 606, as shown in FIG. 4, where pulling handle 614 out moves connecting gear 610 relative to its axis of rotation to thereby disengage the teeth of connecting gear 610 from the teeth of drive gear 608 and driven gear 610.

As understood from FIG. 7, gearbox 604 includes a biasing member, which in the illustrated embodiment comprises a spring 618 that presses against an inside surface of housing 606 to normally bias connecting gear 610 into engagement with drive gear 608 and driven gear 610. Housing 606 further includes an external protuberance or projection 620 disposed about the opening 622 in housing 606 through which shaft 616 of handle 614 extends, with projection 620 including notches or slots 624 (one shown in FIGS. 3 and 4). Handle 614 correspondingly includes radial projections or keys 626 that are positioned within slots 624 when connecting gear 612 is engaged with drive gear 608 and driven gear 610. When handle 614 is pulled out to disengage power drive system 600 by disengaging connecting gear 612 from drive gear 608 and driven gear 610, handle 614 may be rotated, such as ninety degrees, to misalign keys 626 from slots 624 to thereby prevent spring 618 from unintentionally reengaging connecting gear 612 with drive gear 608 and driven gear 610.

Crank 38 is connected to shaft 72 by a slip ring connector 628 that allows shaft 72 to rotate without movement of crank 38. Crank 38 can therefore be retained in holder 630 mounted to housing 32 while leg 34 is extended and retracted via power drive system 600. When power drive system 600 is disengaged, crank 38 may be moved into the orientation of FIG. 4 for manually raising and lowering leg 34.

The powered operation of landing gear 30 when power drive system 600 is engaged will now be discussed with reference to FIGS. 5-8. When power drive system 600 is engaged such that connecting gear 612 is engaged with drive gear 608 and driven gear 610, an operator may selectively actuate drive motor 602 to raise and lower leg 34 via a manually actuated electrical switch 632. (See FIG. 8). It should be appreciated that electrical switch 632 can be mounted in various locations, such as a three-position electrical switch located adjacent power drive system 600 or even on drive motor itself, with the positions corresponding to off and rotation in either of two directions and with the motor 602 wired for receiving battery power from a tractor (not shown).

Figure 8:
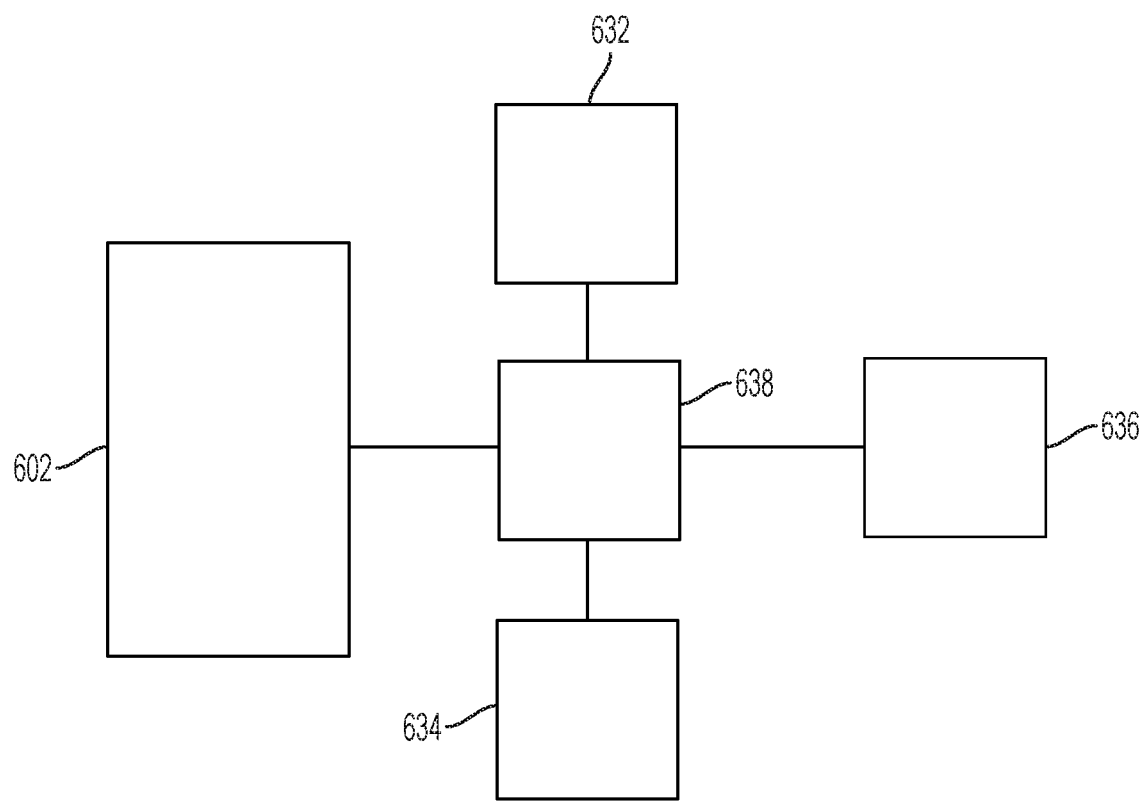
FIG. 8 is a schematic illustration of a controller for controlling operation of the power drive system.

As understood with reference to FIGS. 5 and 8, a pair of limit switches 634, 636 are provided that interact with circuit 638 to control operation of power drive system 600, where circuit 638 may operatively get power from wiring harness 701 and/or from rechargeable power supply 709. Although the noted controller is discussed in connection with circuit 638, it should be readily appreciated that the controller may be alternatively configured.

Limit switch 634 is associated with the upward movement of leg 34 and thereby comprises an "up" limit switch that is actuated by a limit switch actuator 640 that includes a sleeve or guide 642 held by a retainer 644 to the floor base 148 that is fixedly mounted within housing 32, with guide 642 being mounted at an aperture in base 148. A pin 646 having a head 648 and a lower end 650 is movably contained within guide 642 and extends through base 148. As understood from FIG. 7, a biasing member in the form of spring 652 is provided that operates to bias pin 646 vertically downward relative to its axial length. Landing gear 30 includes a lift nut 146 that is affixed to leg 34 within which the elevation screw for the landing gear 30 rotates to raise and lower leg 34, where FIGS. 5-7 shown lift nut 146 in its elevated orientation associated with leg 34 having been raised up such that lift nut 146 contacts lower end 650 of pin 646. Continued movement of lift nut 146 will cause head 648 to trip limit switch 634, with limit switch 634 then causing power to drive motor 602 to be turned off such that power drive system 600 ceases raising leg 34. Thus, when gear motor 602 is engaged and then activated by a user to raise leg 34, power drive system 600 will raise leg 34 until actuator 640 trips limit switch 634 to cease motion of leg 34.

Limit switch 636 is associated with downward movement of leg 34 and thereby comprises a "down" limit switch that operates in connection with circuit 638 to turn power drive system 600 off when leg 34 is sufficiently or fully lowered. Limit switch 636 is actuated by a down limit switch actuator 654 that moves when leg 34 contacts a support surface. In the illustrated embodiment, actuator 654 is formed as a tab attached to and extending from an actuator member 56 associated with gear assembly 42, where actuator member 56 moves to shift the gear assembly 42 between a high gear and low gear operation when leg 34 contacts a support surface. The operation of actuator member 56 relative to the automatic shifting of gear assembly 42 between high and low gear is discussed in the incorporated U.S. patent application Ser. No. 14/096,731 and corresponding international patent application PCT/US2013/073134, and in more detail below.

As understood from FIG. 8, down limit switch 636 is connected with circuit 638. Circuit 638 includes a timer portion or component that is triggered by down limit switch 636 when actuator 654 actuates the down limit switch 636. Upon triggering the timer portion of circuit 638, circuit 638 will continue to operate drive motor 602 for a predetermined period of time sufficient to extend leg 34 from housing 32 of landing gear 30. For example, the predetermined period of time can be established to ensure that trailer 26 is appropriately raised or disengaged from the fifth wheel of a truck.

Figure 8A:
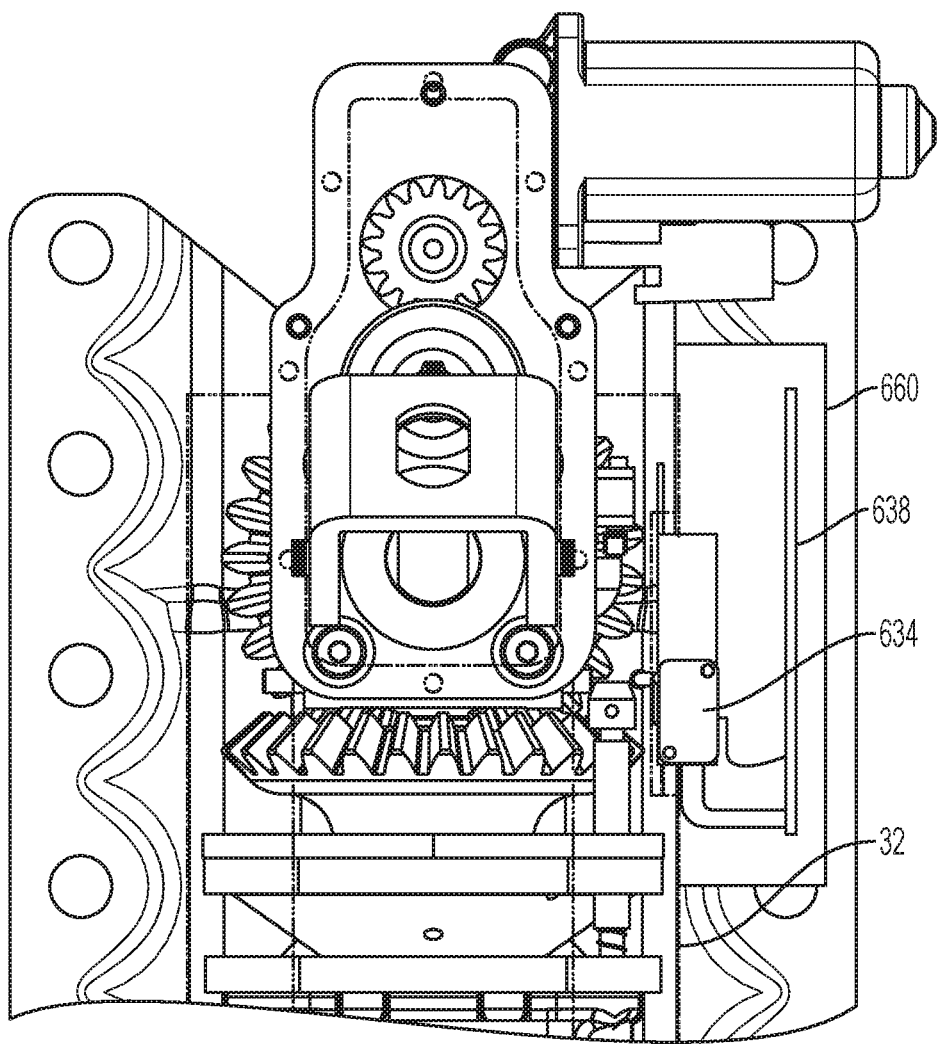
FIG. 8A is a partial front view of an embodiment of a wirelessly controlled powered landing gear in accordance with an aspect of the present invention.
Figure 8B:
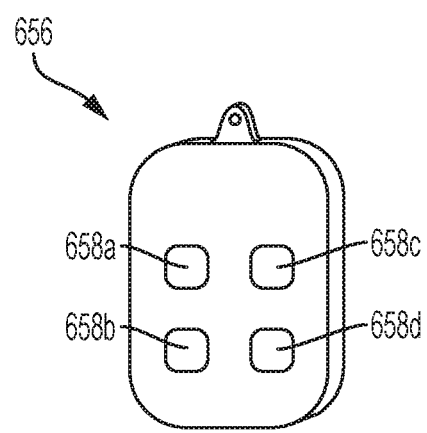
FIG. 8B is a controller for operating the powered landing gear of FIG. 8A.

Still further, with reference to FIGS. 8A-8D, power drive system 600 may be additionally or alternatively constructed to operate wirelessly, such as via circuit 638. In such an embodiment switch 632 may or may not be included with an alternative controller being employed. For example, a wireless controller or remote control 656 is illustrated in FIG. 8B for operation of landing gear 30, where controller 656 is constructed in the form of a handheld key fob that may be used to hold or carry vehicle keys, with controller 656 including multiple buttons 658a, 658b, 658c and 658d. Controller 656 may thereby be used by an operator to remotely raise and lower leg 34 of landing gear 30. Button 658a comprises an up or lift button, wherein the pressing of button 658a by an operator initiates lifting or raising of leg 34 by way of drive motor 602. As noted above, leg 34 will continue to raise until actuator 640 trips limit switch 634 to cease motion of leg 34. Alternatively, while leg 34 is being raised, an operator may press button 658b to automatically stop the lifting of leg 34 prior to leg 34 having reached its fully raised position, where pressing of button 658b during the lifting cycle will cause motor 602 to be shut off.

Correspondingly, the pressing of button 658c on controller 656 by an operator will cause leg 34 to be automatically lowered, such as from the fully up position or otherwise. Once activated, as discussed above, leg 34 will continue to be lowered until actuator 654 triggers down limit switch 636, at which point circuit 638 will continue to operate drive motor 602 for a predetermined period of time sufficient to extend leg 34 from housing 32 of landing gear 30. Alternatively, while leg 34 is being lowered, an operator may press button 658d to automatically stop the lowering of leg 34 prior to leg being fully lowered, where pressing of button 658d during the lowering cycle will cause motor 602 to be shut off.

Controller 656 and circuit board 638 may be conventionally constructed, with controller 656 operating as a radio transmitter and circuit board 638 including or operating as a receiver. It should be understood that alternative wireless communication technology may be employed, such as, but not limited to, Wi-Fi, Bluetooth, or the like. FIG. 8A discloses the inclusion of circuit board 638 mounted internally of housing or cover 660, where cover 660 comprises an enclosure that is mounted to the exterior of housing 32 of landing gear 30. Limit switches 634, 636 are mounted to the exterior of housing 32 and connected with circuit board 638, with housing 32 including slots through which limit switches 634, 636 are able to be actuated by actuators 640, 654, respectively. Cover 660 thereby protects circuit 638 and limit switches 634, 636 from damage, moisture and the like.

Figure 8C:
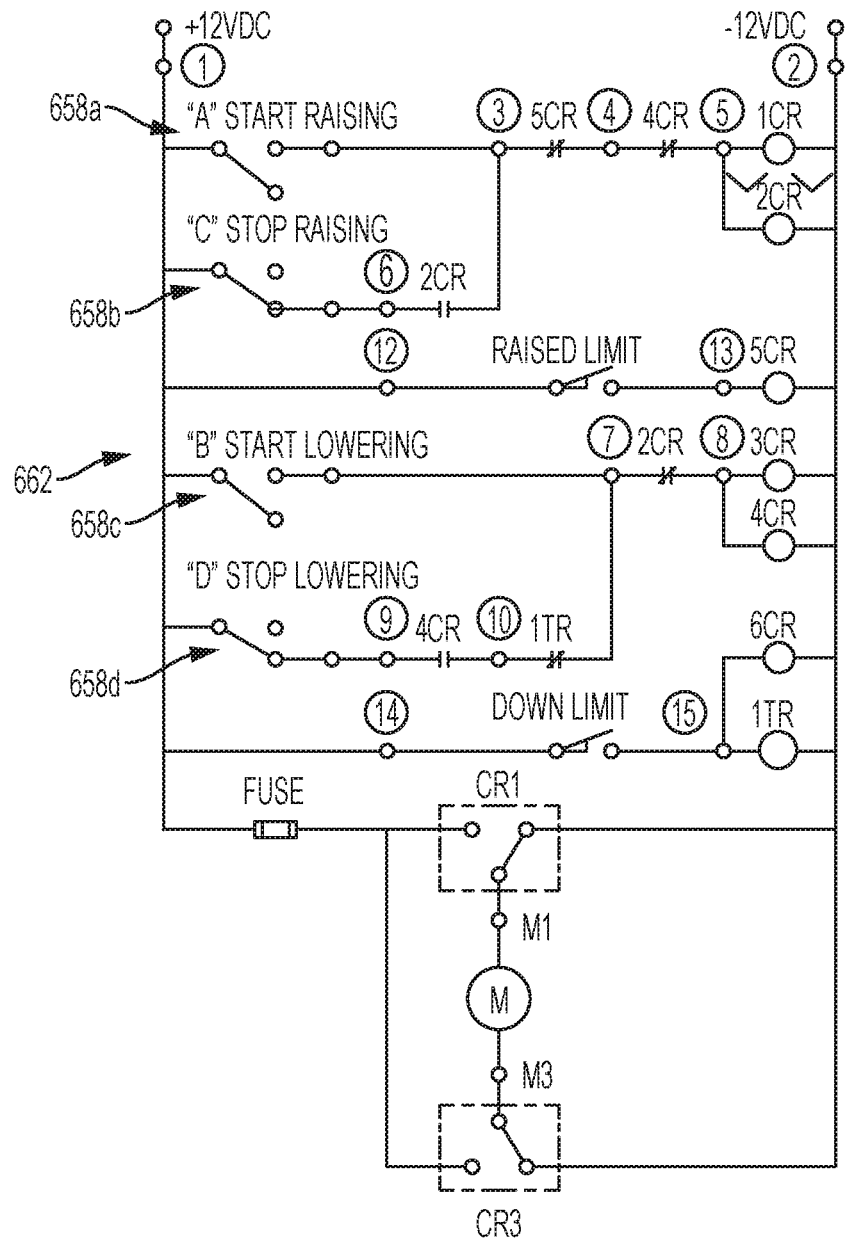
FIG. 8C is a wiring control diagram for the powered landing gear of FIG. 8A.
Figure 8D:
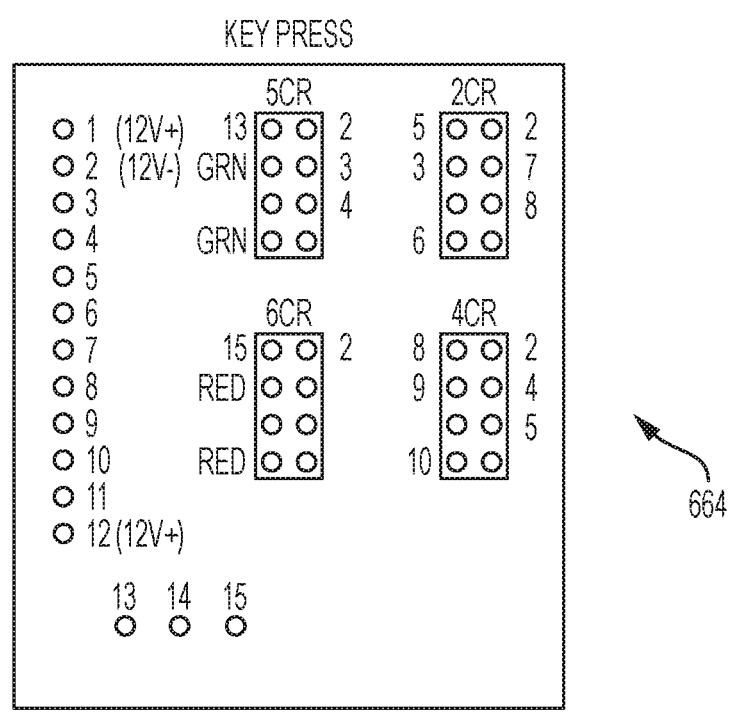
FIG. 8D is a circuit board for the powered landing gear of FIG. 8A.

FIGS. 8C and 8D discloses a wiring or control diagram 662 and circuit or control board 664 for the wireless control system discussed above with regard to FIGS. 8A and 8B. As understood from FIG. 8C, the associated buttons 658a-658d are indicated in association with the various control relays identified as "CR." Alternatively, one or more buttons for operating landing gear 30 may be disposed at the landing gear 30, or may be located within the cab of truck 21.

Figure 9:
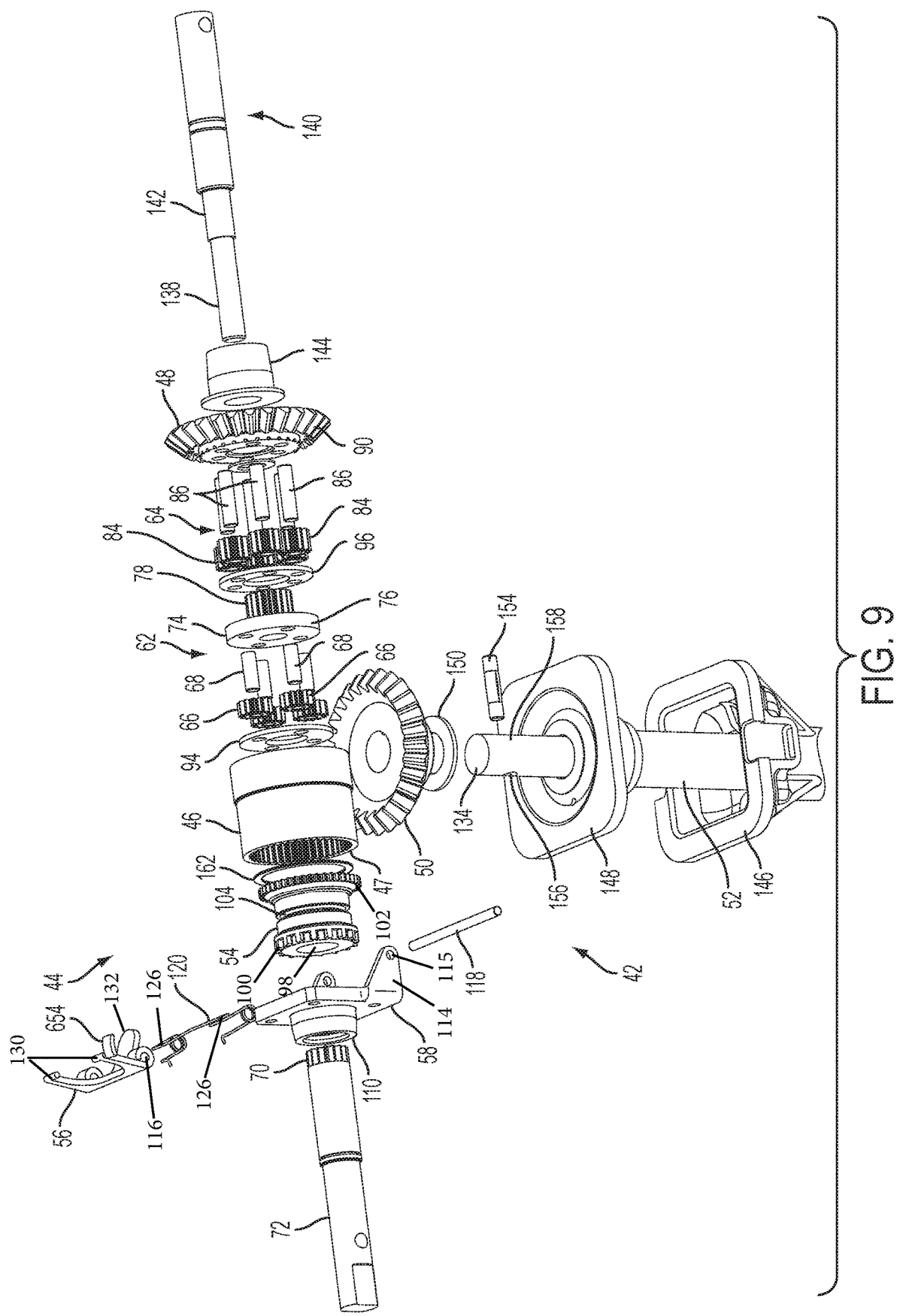
FIG. 9 is an exploded perspective view of the gear assembly of FIG. 5.

The operation of internal gear assembly 42 of landing gear 30 will now be discussed with further reference to FIGS. 9-10B. As noted, landing gear 30 includes automatically shifting gearbox or gear assembly 42, with gear assembly 42 being contained within housing 32. As discussed in detail below, gear assembly 42 provides both a high gear or high speed for rapidly extending and retracting leg 34 when there is no load on leg 34, as well as a low gear or low speed that is reduced from the input rotation provided by crank 38 for extending and retracting leg 34 when loaded. Moreover, gear assembly 42 automatically switches between high and low gears based on gear assembly 42 sensing or reacting to whether or not a load is applied to leg 34. That is, gear assembly 42 operates in a low gear when foot 36 is on a support surface and landing gear 30 is supporting weight of the semitrailer 26 and, conversely, gear assembly 42 operates in a high gear when foot 36 is not in contact with the support surface and landing gear 30 is not supporting the weight of the semitrailer 26, such as when the semitrailer 26 is joined to a fifth wheel of a truck and leg 34 is being retracted for road travel or when lowering the leg 34 prior to contact with the support surface when disconnecting semitrailer 26 from a truck. The shifting between high and low gears occurs automatically based on the state of the loading, without input from or adjustment by an operator of crank 38.

As understood from FIGS. 5, 9, 10A and 10B, gear assembly 42 comprises a planetary gear system or assembly 44 to achieve the necessary reduction in the low gear state, as well as an associated cylindrical ring gear 46 that is directly or concurrently driven when operating in the high gear state, with a set of drive gears comprising bevel gears 48, 50 being used to transmit torque to an elevation member configured as an elevation or jack screw 52 connected with landing gear let 34 to thereby extend and retract leg 34.

As discussed in more detail below, ring gear 46 is selectively actuated by way of an engagement member or shift member 54 that axially moves relative to ring gear 46 in connection with automatic shifting between high and low gears. When gear assembly 42 is in high gear, ring gear 46 concurrently rotates when an operator turns crank 38, whereby there is no reduction because bevel gears 48, 50 power elevation screw 52 by direct drive. (See FIG. 10A). Upon foot 36 of leg 34 contacting the support surface, gear assembly 42 automatically shifts into low gear by elevation screw 52 translating axially relative to the orientation of housing 32, with elevation screw 52 driving an actuator member 56 to move shift member 54 into engagement with actuator mount 58 to thereby prevent rotation of shift member 54. When so moved, shift member 54 remains engaged with ring gear 46 such that ring gear 46 is also prevented from rotating. As discussed below, rotation of crank 38 then causes components of gear assembly 42 to operate within the interior 60 of ring gear 46 to provide the gear reduction needed under loaded conditions. (See FIG. 10B).

In the embodiment of FIGS. 5-10B, the planetary gear assembly 44 of gear assembly 42 includes both a primary planetary gear assembly 62 and a secondary planetary gear assembly 64 that are interconnected via the sharing of a gear member 74 and are assembled within ring gear 46. Primary planetary gear assembly includes multiple primary planet gears 66 that are each mounted for rotation on separate axles 68 and mesh with a primary sun gear 70 formed on the end of the input shaft 72, where crank 38 is selectively attached to the opposite end of input shaft 72 for imparting driving rotation to gear assembly 42. In the embodiment shown four primary planet gears 66 are utilized, but alternative numbers could be utilized. Axles 68 are mounted at one end to gear member 74 that comprises a combined primary carrier 76 and secondary sun gear 78, with axles 68 being mounted within holes 80 of primary carrier 76 to extend outwardly from face 82 of carrier 76. As discussed in more detail below, the opposite ends of axles 68 extend beyond primary planet gears 66 whereby the axles are selectively engaged by shift member 54.

Primary carrier 76 and secondary sun gear 78 of gear member 74 rotate together, with gear member 74 thus forming part of both the primary and secondary planetary gear assemblies. Secondary planetary gear assembly further includes multiple secondary planet gears 84 that are each mounted for rotation on separate axles 86 and mesh with secondary sun gear 78. Axles 86 are mounted within holes on face 90 of input drive bevel gear 48, whereby input bevel gear 48 comprises a secondary carrier 92 of the secondary planetary gear assembly. In the embodiment shown six secondary planet gears 66 are utilized, but alternative numbers could be utilized.

A pair of support rings 94, 96 are additionally provided that receive the axles 68 and 86. Support ring 94 includes multiple holes for receiving the axles 68 of the primary planetary gear assembly 62 on the opposite side of primary planet gears 66 relative to primary carrier 76. Similarly, support ring 96 includes multiple holes for receiving the axles 86 of the secondary planetary gear assembly 64 on the opposite side of secondary planet gears 84 relative to secondary carrier 92 of input bevel 48. Rings 94, 96 operate to provide rigidity to the assembly of the primary and secondary planetary gear assemblies, respectively.

As noted, gear assembly 42 further includes shift member 54, where shift member 54 comprises and operates as a shift dog or dog clutch. Shift member 54 is shown to include a central through hole 98 whereby it is slidingly mounted to input shaft 72. Shift member 54 further includes a first geared end 100, a second geared end 102 and a circumferential groove 104 located between geared ends 100 and 102, where groove 104 is formed in a central location of shift member 54 that has a smaller diameter than either of geared ends 100, 102. In the embodiment shown, geared end 100 includes teeth and geared end 102 includes teeth, with teeth of geared end 102 engaging internal circumferentially disposed gear teeth 47 located within the interior 60 of ring gear 46. As thus understood, ring gear 46 comprises an internal gear. Still further, teeth of geared end 100 selectively engage with a lock member or receptacle formed as a mating gear that in the illustrated embodiment is formed as part of actuator mount 58, where the mating gear comprises a spline gear. It should be appreciated that the lock member need not be constructed as a mating spline gear in order to operate and that alternative shapes, structures and configurations on shift member 54 and lock member may be employed for preventing rotation of shift member 54. Shift member 54 further includes multiple elongate apertures located on a face of first geared end 102 where the apertures selectively receive ends of axles 68 extending beyond primary planet gears 66 mounted thereon.

Actuator mount 58 includes a pair of extending tabs or flanges 114 with holes 115 with actuator 56 being joined to actuator mount 58 between flanges 114. In particular, actuator 56 includes mounting holes 116 where a pivot pin or shaft 118 (FIG. 9) is positioned within holes 115 on flanges 114 and mounting holes 116 of actuator 56 when actuator 56 is positioned between flanges 114 to retain actuator 56 to actuator mount 58. A biasing member constructed as a torsion spring 120 is joined to actuator mount 58, with spring 120 including arms, coiled openings and members 126. The coiled openings are disposed over ends of pin 118 with the arms engaging flanges 114 whereby members 126 of spring 120 press against portions of actuator 56 to provide a downwardly pivoting biasing force to actuator 56.

With specific reference to FIG. 12, actuator 56 further includes a pair of arms with inwardly disposed projections 130, where the arms define an opening there between for receiving shift member 54 when assembled. Actuator further includes an additional outwardly projecting tab or arm 132 where the arms form an approximately 110 degree angle relative to tab 132 in the illustrated embodiment.

When gear assembly 42 is assembled, the arms of actuator 56 are disposed about central portion 105 of shift member 54, with projections 130 being disposed within groove 104. Spring 120 is assembled to actuator mount 58 such that members 126 are disposed between plate 112 and arms 128 whereby members 126 act on the arms of the actuator to pivot the actuator 56 about shaft 118 such that tab 132 is downwardly biased. Spring 120 thus correspondingly biases shift member 54 to be disengaged from the mating gear of the actuator mount 58 via projections 130 acting on shift member 54 in groove 104. As understood from FIGS. 10A and 10B, geared end 102 of shift member 54 is disposed within ring gear 46 such that spring 120 biases shift member 54 into ring gear 46. When so biased, shift member 54 engages the axles 68 of the primary planet gears 66, with the ends of the axles 68 being received within the apertures 108 of shift member 54 in the high gear position.

Referring again to FIGS. 9-10B, input shaft 72 includes a cavity 136 into which an end 138 of output shaft 140 is inserted. Shift member 54 is slidably disposed over input shaft 72 and gear member 74 is disposed over a recessed portion 142 of output shaft 140, where portion 142 has a larger diameter than that of end 138. Still further, input bevel 48 is mounted to the largest diameter portion of output shaft 140 with input bevel 48 including a key groove for mating with a key on shaft 140 whereby input bevel 48 rotates with shaft 140. When assembled, output shaft 140 is further supported within an additional bearing 144 affixed to housing 32 whereby transverse shaft 40 may then be affixed to the portion of output shaft 140 extending from housing 32.

As further understood from FIGS. 5-10B, landing gear 30 includes a lift nut 146 that is fixedly mounted to leg 34 with elevation screw 52 rotating within lift nut 146 to extend and retract leg 34. Also included is a floor base 148 that is fixedly mounted within housing 32, with a thrust washer 150 being positioned between floor base 148 and output drive bevel gear 50 when assembled. Output bevel gear 50 includes a cavity or slot 152 within which a drive pin 154 is located, where drive pin 154 is passed through a hole 156 in shaft 158 of elevation screw 52 with drive pin 154 operating to transmit rotational torque from output bevel gear 50 to elevation screw 52. As discussed below, cavity 152 is sufficiently deep relative to the bottom surface 160 to enable shaft 158 to move transversely relative to output bevel gear 50 between a first position illustrated in FIG. 10A associated with high speed operation and a second position illustrated in FIG. 10B associated with low speed operation.

As previously noted, when gear assembly 42 is assembled primary and secondary planetary gear assemblies are positioned within the interior 60 of ring gear 46. In addition, a retaining ring 162 is positioned between the primary planet gears 66 and secondary planet gears 84. Ring gear 46 includes an internal groove formed in teeth 47 with retaining ring 162 being positioned within groove 164. In the illustrated embodiment retaining ring 46 comprises a conventional internal spiral retaining ring.

Figure 10A:
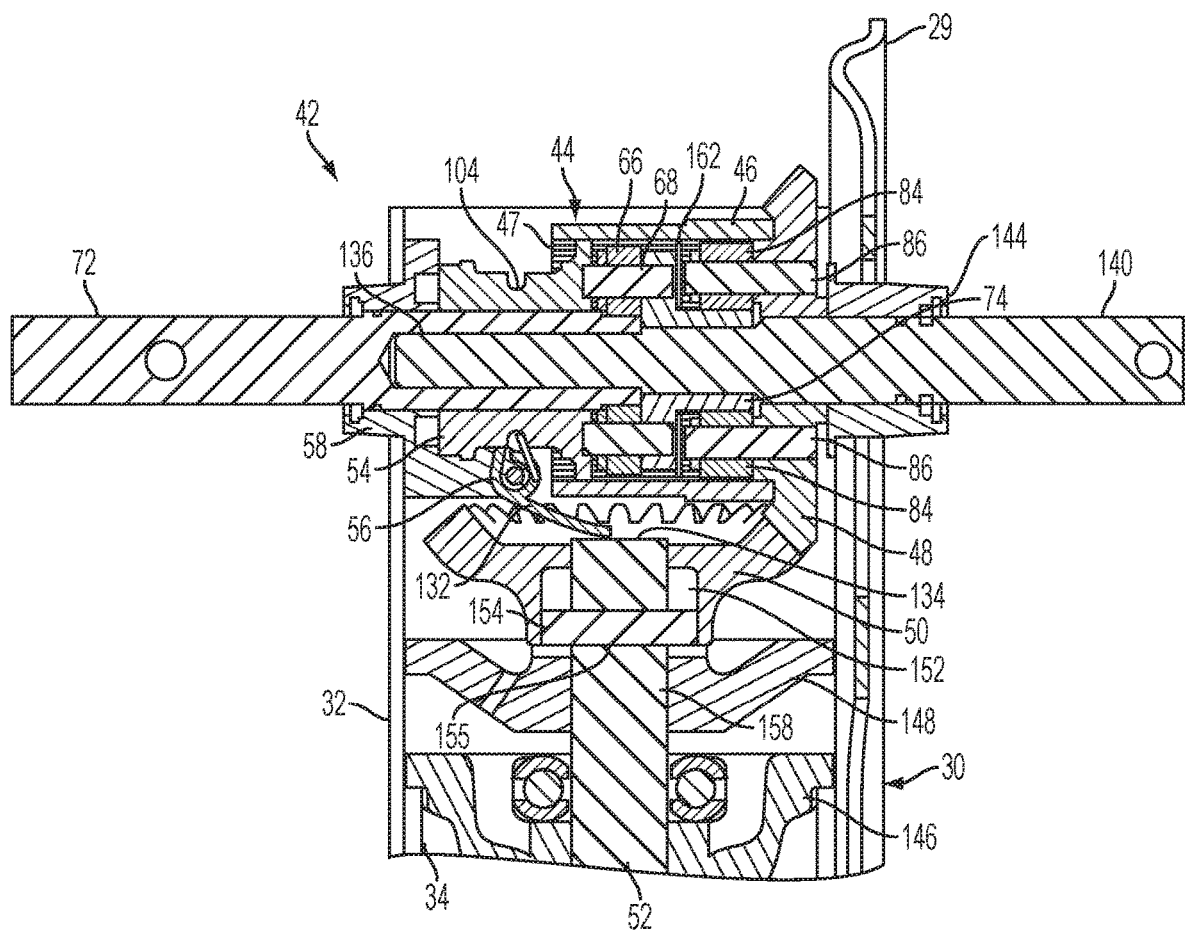
FIG. 10A is a side cross sectional view of the landing gear of FIG. 5 operating in a high gear setting.

The operation of landing gear 30, including the automatic shifting, will now be discussed with principal reference to FIGS. 10A and 10B. In the high gear orientation of FIG. 10A, shift member 54 is in a first position biased out of engagement with mating gear 106 of actuator mount 58 by spring 120 and teeth 103 of geared end 102 of shift member 54 are engaged with internal teeth 47 of ring gear 46. Shift member 54 is additionally biased into engagement with axles 68 of primary planetary gears 66, with the axles 68 being received within elongated apertures 108. Of note the elongated construction of apertures 108 aids in receiving axles 68 therein when shift member 54 is moved into engagement with axles 68. Primary sun gear 70 on input shaft 72 is engaged with primary planet gears 66 such that, with axles 68 engaged with shift member 54, as well as because axles 68 are mounted to gear member 74, rotation of input shaft 72 causes direct drive rotation of the planetary gear assembly to input bevel gear 48. That is ring gear 46 rotates as does gear member 74 without relative rotation of planetary gears 66, 84 such that input bevel gear 48 rotates on a one-to-one rotational basis with input shaft 72 by way of the mounting of secondary planet gears 84 to secondary carrier 92 of input shaft 72 to thereby raise and lower leg 34 when not under load. In the illustrated embodiment input bevel gear 48 and output bevel gear 50 are approximately the same size such that the ratio of rotation of input shaft 72 to elevation screw 52 is one-to-one or approximately one-to-one. Alternatively, however, output bevel gear 50 and input bevel gear 48 may be alternatively sized relative to each other to obtain alternative high gear ratios. For example, output bevel gear 50 may be sized to be smaller than input bevel gear 48 whereby the ratio of input shaft 72 revolutions in high speed to output bevel gear 50 revolutions is less than one, including, for example, in the range of four to one.

Figure 10B:
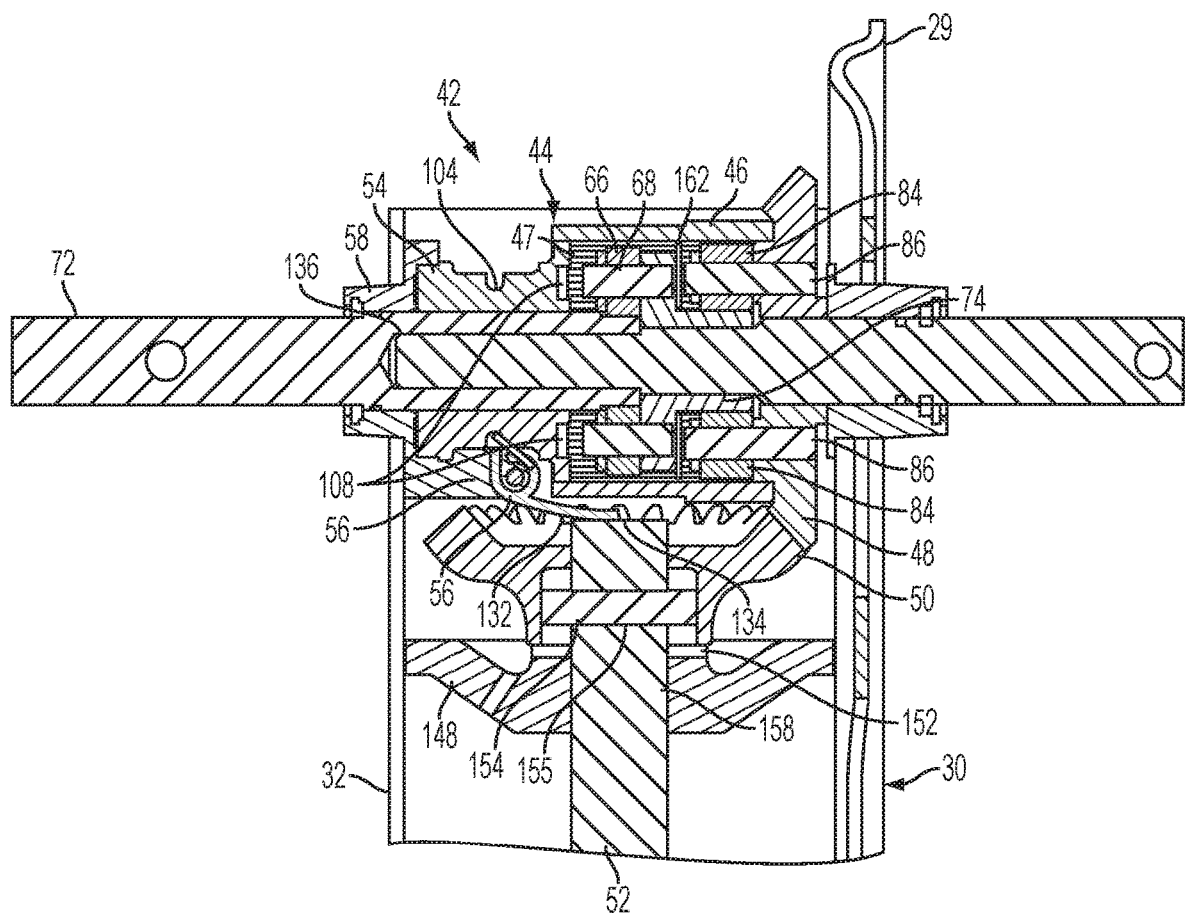
FIG. 10B is a side cross sectional view of the landing gear of FIG. 5 operating in a low gear setting.

As understood from FIG. 10B, upon pad 36 of leg 34 contacting a support surface, elevation screw 52 axially translates upward relative to output bevel 50, with upper portion 134 of shaft 158 acting on tab 132 to pivot actuator 56 upwards against the force of spring 120. The upward axial movement is caused by continued rotation of elevation screw 52 when pad 36 contacts the support surface and is enabled by way of the cavity 152 in output bevel gear 50. Shift member 54 is thereby moved into a second position by actuator 56, with arms 128 axially shifting or moving shift member 54 by way of projections 130 disposed within groove 104 to simultaneously disengage shift member 54 from axles 68 such that axles 68 are no longer contained within apertures 108, as well as to engage teeth 101 of geared end 100 of shift member 54 into engagement with mating gear 106 of actuator mount 58. Teeth 103 of geared end 100, however, remain engaged with teeth 47 of ring gear 46. As understood from FIG. 5B, the axial shifting or movement of shift member 54 when switching between high gear and low gear is transverse to the telescopic movement of leg 34. The engagement of shift member 54 with mating gear 106 prevents shift member 54 from rotating, which in turn also locks and prevents ring gear 46 from rotating. Thus, rotation of input shaft 72 causes rotation of the planetary gear assembly 44 within ring gear 46. That is, primary planet gears 66 are caused to rotate within the interior 60 of ring gear 46, which in turn causes gear member 74 to rotate due to the engagement of axles 68 with primary carrier 76, with secondary sun gear 78 in turn imparting rotation to secondary planet gears 84 within ring gear 46 and thereby rotating input bevel gear 48 by way of their connection via secondary carrier 92 on input bevel gear 48. Accordingly, in low gear or low speed, as shown in FIG. 10B, a reduction occurs between rotation of input shaft 72 and input bevel gear 48. In the illustrated embodiment, secondary sun gear 78 is larger than the primary sun gear 70, and the primary planet gears 66 are larger than the secondary planet gears 84. It should be appreciated, however, that these size differences could be reversed, or the gears of the primary and secondary planetary gear assemblies could be the same. The provision of both primary and secondary planetary gear assemblies 62, 64 enables desired gear ratios to be provided in the low gear setting. A planetary gear assembly in accordance with the present invention may be constructed to have, for example, a ratio of between 20 to 1 to 40 to 1.

Actuator member 56, shift member 54 and actuator mount 58 thus operate as an actuator assembly to achieve automatic shifting between high and low gear. As disclosed, automatic shifting occurs without any additional action from an operator of landing gear 30 with the input shaft 72 not requiring to be moved, such as in an axial direction or otherwise, to accomplish shifting. Although disclosed as utilizing a mechanical actuation for automatic shifting, automatic shifting of the gear assembly 42 may alternatively be accomplished by way of a solenoid or linear motor, such as to axially move shift member 54. Still further, automatic shifting between high and low speeds may alternatively be accomplished by way of either an increase or decrease in the input or output torque involved in extending and retracting leg 34. For example, input shaft 72 may be connected with gear assembly 42 in similar manner to the construction of a torque wrench whereby upon reaching a particular increase in input torque required to extend leg 34, such as when pad 36 contacts the support surface, automatic shifting to low gear occurs by way of shifting shift member 54.

The telescoping legs of the landing gear may be extended when the crank is turned clockwise, with the high gear ratio being minimized to rapidly extend and retract the telescoping leg and thereby minimize the amount of time required for turning of the crank, and the low gear ratio being maximized to decrease the required torque input to facilitate turning of the crank when under loaded conditions. In a particular embodiment, for example, the high and low gear ratios were 2.5 turns and 34 turns, respectively, for a one-inch displacement of the telescoping leg.

A method of automatically shifting a landing gear thus comprises axially displacing an elevation member within a housing member via a drive motor by raising or lowering an associated telescopic leg into contact with a support surface, and preventing rotation of a ring gear of a planetary gear assembly as a result thereof. The method further including moving an actuator by the axially displacing of the elevation member, and in turn moving a shift member to prevent rotation of the ring gear.

It should be appreciated, however, that alternative constructions may be employed within the scope of the present invention. For example, a planetary gear system may be provided with more or fewer primary and/or secondary planet gears. Various flanges, gussets or brackets (not shown) may also be used for connecting landing gear to a semitrailer, as may be required. Still further, rather than a hand crank, rotational input motion may be provided by an electric or hydraulic motor. Additional changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A powered landing gear system mounted to a trailer comprising:
    a multi-pin electrical connector mounted to the trailer, said electrical connector configured to receive a jumper cable connected to a truck for supplying electrical power to the trailer;
    a wiring harness mounted to the trailer and electrically coupled to said electrical connector;
    a landing gear assembly mounted to the trailer, said landing gear assembly including a housing member, a telescoping leg member, a gear assembly configured to extend and retract said leg member relative to said housing member, and a drive system including a drive motor operatively engaged with said gear assembly; and
    a controller disposed on the trailer, said controller being configured to selectively operate said drive system, with said drive system being operatively electrically powered through said electrical connector and said wiring harness, and wherein power is additionally supplied through said electrical connector to at least one light on the trailer;
    wherein said landing gear assembly includes at least one limit switch that is electrically coupled to said controller and is configured to being tripped during movement of said leg member under operation of said drive motor, and wherein said controller is configured to continue operating said drive motor for a predetermined time period upon said at least one limit switch being tripped.

2. The powered landing gear system of claim 1, wherein said at least one limit switch comprises a down limit switch electrically coupled with said controller, said down limit switch configured to being tripped by said landing gear assembly when said leg member is moved into an extended position, wherein said controller is configured to operate said drive motor for a predetermined time after said down limit switch is tripped by said landing gear assembly.

3. The powered landing gear system of claim 2, further including an up limit switch electrically coupled with said controller, said up limit switch configured to being tripped by said landing gear assembly when said leg member is moved into a retracted position, wherein said controller is configured to stop operation of said drive motor after said up limit switch is tripped by said landing gear assembly.

4. The powered landing gear system of claim 1, wherein said at least one light on the trailer comprises at least one of turn lights, running lights, and brake lights of the trailer.

5. The powered landing gear system of claim 1, further including a rechargeable power supply mounted to the trailer, wherein said rechargeable power supply is operatively electrically coupled to said wiring harness and wherein said drive system is operatively electrically coupled to said rechargeable power supply.

6. The powered landing gear system of claim 1, further including a remote control device, said remote control device configured to selectively actuate said controller to control operation of said drive system.

7. The powered landing gear system of claim 1, further including a manually actuated switch configured to selectively actuate said drive motor.

8. The powered landing gear system of claim 1, wherein said controller comprises an electrical circuit.

9. A powered landing gear system mounted to a trailer comprising:
   an electrical connector mounted to the trailer, said electrical connector configured to receive a jumper cable connected to a truck for supplying electrical power to the trailer;
   a wiring harness mounted to the trailer and electrically coupled to said electrical connector;
   a powered landing gear mounted to the trailer, said powered landing gear including a housing member, a telescoping leg member, a gear assembly configured to extend and retract said leg member relative to said housing member, at least one limit switch, and a drive system including a drive motor operatively engaged with said gear assembly; and
   a controller, wherein said drive motor is electrically coupled with the controller, and wherein the controller is operative to control the drive motor;
   said powered landing gear being operatively powered by electricity provided through said electrical connector and said wiring harness, wherein said at least one limit switch is electrically coupled to said controller and is configured to being tripped during movement of said leg member under operation of said drive motor, and wherein said controller is configured to continue operating said drive motor for a predetermined time period upon said at least one limit switch being tripped.

10. The powered landing gear system of claim 9, wherein said drive motor of said drive system is operatively electrically coupled to said wiring harness.

11. The powered landing gear system of claim 10, wherein said electrical connector comprises a multi-pin electrical connector.

12. The powered landing gear system of claim 11, wherein said at least one limit switch comprises a down limit switch associated with downward movement of said leg member.

13. The powered landing gear system of claim 12, wherein said drive system further includes an up limit switch associated with upward movement of said leg member.

14. The powered landing gear system of claim 9, further including a rechargeable power supply, wherein said rechargeable power supply is operatively electrically coupled to said wiring harness, and wherein said drive motor of said drive system is operatively electrically coupled to said rechargeable power supply.

15. The powered landing gear system of claim 14, wherein said rechargeable power supply comprises at least one of a battery pack and a capacitor.

16. The powered landing gear system of claim 14, wherein said at least one limit switch comprises a down limit switch associated with downward movement of said leg member.

17. The powered landing gear system of claim 9, wherein said electrical connector includes a plurality of connections for providing electrical power to the trailer.

18. The powered landing gear system of claim 17, wherein said wiring harness operatively additionally provides power to turn lights and/or brake lights of the trailer.

19. The powered landing gear system of claim 18, wherein said electrical connector includes connections for providing power from said wiring harness to multiple devices on the trailer including turn lights, brake lights, antilock brakes, hazard lights and running lights.

20. The powered landing gear system of claim 9, further including a remote control device, said remote control device configured to selectively interact with the controller to control operation of the drive motor.

21. The powered landing gear system of claim 9, wherein said gear assembly comprises an internal gear assembly located within said housing member, and wherein said powered landing gear further comprises;
   a shaft extending from external of said housing member into said housing member and operatively connected with said internal gear assembly, where said internal gear assembly includes a ring gear arranged to rotate about an axis that is transverse to the telescopic orientation of said leg member with said internal gear assembly configured to operate in a high speed setting and a low speed setting, with said internal gear assembly configured to automatically shift from the high speed setting to the low speed setting; and
   wherein said drive system is attached to said housing member and further includes a drive gear, with said drive motor configured to drive said drive gear with said drive gear operatively driving said shaft.

22. The powered landing gear system of claim 21, further including a driven gear attached to said shaft, wherein said drive gear operatively drives said driven gear, and further including a connecting gear with said connecting gear being disposed between said drive gear and said driven gear, and wherein said connecting gear is configured to be selectively engaged and disengaged with said drive gear and said driven gear.

* * * * *